United States Patent
Massey et al.

(10) Patent No.: US 12,158,908 B1
(45) Date of Patent: Dec. 3, 2024

(54) SYSTEM AND METHODS FOR SYSTEMS ENGINEERING

(71) Applicant: Prewitt Ridge, Inc., Los Angeles, CA (US)

(72) Inventors: Steven Massey, Los Angeles, CA (US); Hart Massie-Keller, New York, NY (US); Charles Brechtel, Culver City, CA (US)

(73) Assignee: Prewitt Ridge, Inc., Los Angeles, CA (US)

( * ) Notice: Subject to any disclaimer, the term of this patent is extended or adjusted under 35 U.S.C. 154(b) by 0 days.

(21) Appl. No.: 18/531,258

(22) Filed: Dec. 6, 2023

(51) Int. Cl.
*G06F 40/30* (2020.01)
*G06F 16/332* (2019.01)
*G06F 16/338* (2019.01)
*G06F 16/36* (2019.01)
*G06F 40/211* (2020.01)
*G06F 40/40* (2020.01)

(52) U.S. Cl.
CPC ........ *G06F 16/367* (2019.01); *G06F 16/3329* (2019.01); *G06F 16/338* (2019.01); *G06F 40/40* (2020.01)

(58) Field of Classification Search
CPC .......... G06F 40/58; G06F 40/44; G06F 40/45; G06F 40/47
See application file for complete search history.

(56) References Cited

U.S. PATENT DOCUMENTS

| | | | | |
|---|---|---|---|---|
| 9,406,044 | B2* | 8/2016 | Brunswig | G06Q 10/10 |
| 9,442,830 | B1* | 9/2016 | Zhang | G06F 11/3676 |
| 10,735,270 | B1* | 8/2020 | Whipple | G06F 11/302 |
| 2008/0120129 | A1* | 5/2008 | Seubert | G06Q 40/125 |
| | | | | 705/305 |
| 2008/0243912 | A1* | 10/2008 | Azvine | G06Q 10/06 |
| 2018/0373781 | A1* | 12/2018 | Palrecha | G06N 3/08 |
| 2019/0079753 | A1* | 3/2019 | Makkar | G06F 8/36 |
| 2019/0079754 | A1* | 3/2019 | Makkar | G06N 5/022 |
| 2020/0125340 | A1* | 4/2020 | Hoover | G06F 8/10 |
| 2021/0149980 | A1* | 5/2021 | Pavlini | G06F 16/9538 |
| 2023/0004792 | A1* | 1/2023 | de Mello Brandao | |
| | | | | G06N 3/088 |
| 2023/0028912 | A1* | 1/2023 | Steingrimsson | G06F 30/27 |
| 2023/0152764 | A1* | 5/2023 | O'Dierno | G05B 17/02 |
| 2023/0152765 | A1* | 5/2023 | O'Dierno | G05B 17/02 |
| | | | | 700/275 |

(Continued)

*Primary Examiner* — Lamont M Spooner
(74) *Attorney, Agent, or Firm* — Scale LLP

(57) ABSTRACT

Disclosed are methods, systems and non-transitory computer readable memory for systems engineering. For instance, a method may include: receiving, via an input graphical user interface or one or more data connectors, engineering information, wherein the engineering information includes data for a plurality of entities stored on a datastore; processing, using a language model, the engineering information to output entity information, wherein the entity information includes one or more data attributes of a first entity of the plurality of entities; querying an ontological framework using the entity information, wherein querying the ontological framework determines a relationship between the first entity and a second entity of the plurality of entities; and generating an output based, at least in part, on the relationship between the first entity and the second entity.

20 Claims, 12 Drawing Sheets

(56) References Cited

U.S. PATENT DOCUMENTS

| | | | |
|---|---|---|---|
| 2023/0213909 A1* | 7/2023 | Galvez | G05B 15/02 |
| | | | 700/28 |
| 2023/0229944 A1* | 7/2023 | Otieno | G06Q 10/08 |
| | | | 706/45 |
| 2023/0350861 A1* | 11/2023 | Ye | G06N 20/00 |
| 2024/0004361 A1* | 1/2024 | Morris | G05B 15/02 |
| 2024/0012378 A1* | 1/2024 | Morris | G05B 19/042 |

\* cited by examiner

SYSTEM AND METHODS FOR SYSTEMS ENGINEERING

TECHNICAL FIELD

Various aspects of the present disclosure relate generally to systems and methods for systems engineering and, more particularly, to systems and methods for systems engineering using an ontological framework.

BACKGROUND

Generally, systems engineering has been a computational intractable problem. For instance, coordinating design objectives or regulations across several different technological domains for systems components, such as mechanical, electrical, chemical, or software components (collectively, "multi-dimensional relationships"), may result in thousands or millions of explicit or derived engineering/development requirements. For instance, in certain industries, such as aerospace, requirements documentation for a specific project may contain hundreds or thousands of pages of discrete requirements or objectives. Thus, there is a need in systems engineering to avoid errors, re-design, or requirement failures.

Moreover, a significant portion of engineering coordination may be processed by engineers/developers without explicit documentation of relationships (e.g., "latent relationships") between design of components, prototyping of components, testing of components, and validation of components. The latent relationships that are not usually documented and the multi-dimensional relationships may cause additional challenges for reducing errors, re-design, or requirements failures.

The present disclosure is directed to overcoming one or more of these above-referenced challenges.

SUMMARY OF THE DISCLOSURE

According to certain aspects of the disclosure, systems, methods, and computer readable memory are disclosed for systems engineering.

In some cases, a system for systems engineering using an ontological framework may include: at least one memory configured to store computer-readable instructions; and at least one processor configured to execute the computer-readable instructions to perform operations. The operations may include: receive, via an input graphical user interface or one or more data connectors, engineering information, wherein the engineering information includes data for at least one entity of a plurality of entities; process, using a language model, the engineering information to output entity information, wherein the entity information includes one or more data attributes of a first entity of the plurality of entities; query an ontological framework using the entity information, wherein querying the ontological framework determines a relationship between the first entity and a second entity of the plurality of entities; and generate an output based, at least in part, on the relationship between the first entity and the second entity.

In some cases, a computer-implemented method for systems engineering using an ontological framework may include: receiving, via an input graphical user interface or one or more data connectors, engineering information, wherein the engineering information includes data for a plurality of entities stored on a datastore; processing, using a language model, the engineering information to output entity information, wherein the entity information includes one or more data attributes of a first entity of the plurality of entities; querying an ontological framework using the entity information, wherein querying the ontological framework determines a relationship between the first entity and a second entity of the plurality of entities; and generating an output based, at least in part, on the relationship between the first entity and the second entity.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

DETAILED DESCRIPTION

Figure 1:
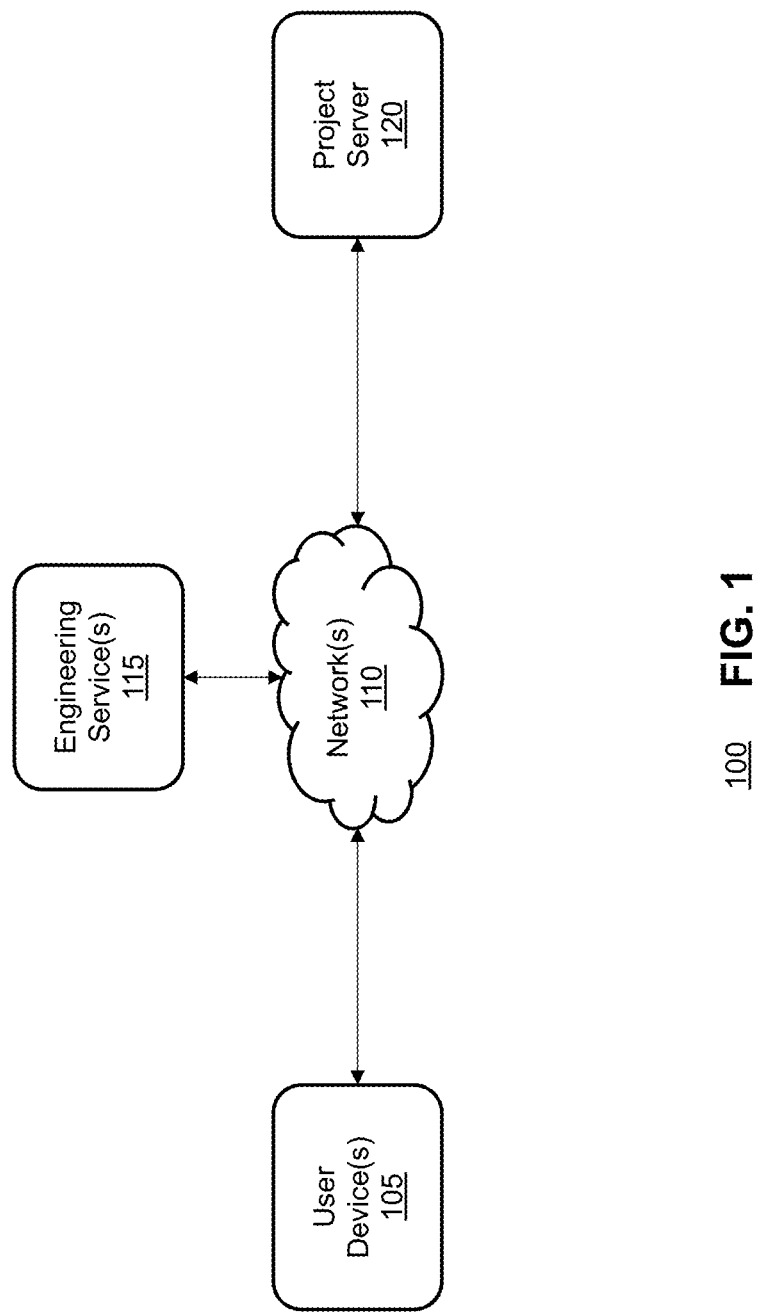
FIG. 1 depicts an example environment for systems engineering.

In general, the present disclosure is directed to methods and systems for systems engineering.

As discussed in detail herein, systems of the present disclosure may process, using a language model, engineering information to output entity information. The entity information may include at least: one or more data attributes of a first entity of the plurality of entities. In some cases, the systems may utilize the language model to handle unstructured or semi-structured data (e.g., text prompts, text input, text files, metadata, headers, code files, and the like) to extract entity-related information, and to generate a structured relationship between discrete data fields, files, records, or pointers to generate entities and relationships between entities (referred to as "language model relationships"). In some cases, the systems may utilize the language model to check structured formats or to check for consistency between unstructured and structured data. In this manner, the language model may make inferences beyond the explicit specific relationships hardcoded by engineers in a project object (e.g., a datastore of project design requirements, documents, testing, verification, engineering files, or pointers to engineering files). Thus, the language model may increase accuracy or safety and increase efficiency of project development, testing, and iteration.

In some cases, the systems may query an ontological framework using the entity information. By querying the ontological framework, the systems may determine a relationship between a query entity (e.g., a first entity) and a second entity. The systems use the second entity to determine if the project object omits the second entity or a relationship to the second entity. In this manner, the systems may reference an external source of relationships to determine if an entity is omitted or (if included) not currently connected to entities already a part of a project object. The omitted or not-currently-connected entities may be automatically joined to the project object or recommended to a user for additional data, verification, and/or confirmation. Thus, omitted entities or not-yet-made relationships between entities may be formed in the project object, thereby increasing accuracy or safety, or reducing engineering time/resources.

In some cases, the systems may generate an output using the language model relationships and/or ontological relationships, such a digital twin, a MBSE diagram, or a conflict identification. In the case of a digital twin, the digital twin may enable faster iteration (for discrete entities and relationships between entities), simulated testing and verification, and the like. In the case of MBSE diagrams, the MBSE diagrams may document design versions and provide external stakeholders with a human-understandable formats of design and requirement verification. In the case of conflict detection, users may be alerted to the conflict so that the conflict may be resolved before, e.g., production, deployment, and the like, thereby reducing waste and/or increasing safety or compliance with requirements.

Thus, methods and systems of the present disclosure may be improvements to computer technology and/or systems engineering.

Environment

FIG. 1 shows an example environment 100 for systems engineering. The environment 100 may include user device(s) 105, network(s) 110, engineering service(s) 115, and a project server 120.

The user device(s) 105 ("user device 105" for ease of reference) may be a personal computing device, such as a cell phone, a tablet, a laptop, or a desktop computer. In some cases, the user device 105 may be an extended reality (XR) device, such as a virtual reality device, an argument reality device, a mixed reality device, and the like. In some cases, the user device 105 may be associated with a user (e.g., an engineer/software developer of a project). The user may have a user account associated with the user device 105 that uniquely identifies the user (e.g., within the project server 120). Additional features of the user device 105 and interactions with other devices are described below.

The network(s) 110 may include one or more local networks, private networks, enterprise networks, public networks (such as the internet), cellular networks, and satellite networks, to connect the various devices in the environment 100. Generally, the various devices of the environment 100 may communicate over network(s) 110 using, e.g., network communication standards that connect endpoints corresponding to the various devices of the environment 100.

The engineering service(s) 115 ("engineering service 115" for ease of reference) may be local (e.g., on a user device 105) or cloud services for engineering or software services. For instance, engineering or software services may include: (1) simulation software, CAD software, FEA software, electronics modeling software, orbital mechanics software, chemical reactions software, and the like, for modeling, designing, development, testing, maintenance, and the like of physical, electrical, and chemical systems and process; (2) software development services (e.g., code repository, low code or no code development and the like); (3) software hosting services (e.g., enterprise, hybrid, or cloud software-running environments); (4) data modeling services (e.g., data repositories or business software, such as spreadsheets); or (5) machine learning services (e.g., for development, training, testing, and hosting ML models), and the like. Generally, the engineering or software services may be native environments where engineers/software developers design and build discrete components (referred herein as "entity") of a projects and the relationships between discrete components. In some cases, the native environments may provide API access (e.g., data connectors) to provide periodic, responsive (e.g., to saves or merge requests), or real-time access to engineering/software specifications, requirements, designs, testing, code, verifications (collectively "engineering information"). In some cases, the native environments may provide export functionality (in addition to, or in place of, API access) to provide (entire or partial) copies of engineering information to users.

The project server 120 may be a computer, a server, a system of servers, and/or a cloud hosted software environment. The project server 120 may be configured to interact with user device(s) 105 and/or engineering service(s) 115 to store, manage, and update project objects for users. Each project object may store, manage, and update a set of entities that each represent a discrete system/subsystem that is physically and/or logically (e.g., in design or software) connected or related to other entities of the set of entities. Each project object may represent a specific, explicit instantiation of a project being developed. The project object may include objectives, requirements (e.g., scope and capabilities of systems/subsystems), how are objectives/requirements verified (e.g., what testing, simulation, or user verification), and maps and interacts with native environments to be used to build and connect physical, electrical, chemical, or software entities.

In some cases, the users are associated with an organization, as a primary user, and the users are end-users of the organization. Each user may have an account that uniquely identifies the user on the project server 120. In some cases, the user may have access to some or all project objects of an organization (as set by organization access and control settings). Some users may have read-only access, while some users may have read-write access and the like, for specific project objects. Some users may have read-only access, while some users may have read-write access and the like, for specific components or features of project objects.

The project server 120 may generate and provide graphical user interfaces to user device(s) 105, so that users of user device(s) may view data, interact with, and provide data/instructions to the project server 120, as discussed herein. In some cases, the project server 120 may enable the user to input text to describe requirements or design features. In some cases, the graphical user interface may be a structured input (e.g., to map entity, features of entities, and relationships between entities). In some cases, the project server 120 may enable the user to upload exported engineering information. In some cases, the project server 120 may enable the user to connect certain native environments using data connectors (e.g., access credentials to access engineering information via APIs) so that the user does not need to manually port data from native environments. Thus, the project server 120 may receive, via an input graphical user interface or one or more data connectors, engineering information. The engineering information may include data for at least one entity, one or more entities, or a plurality of entities to be stored on a datastore (e.g., project datastore 216).

In some cases, the project server 120 may process, using a language model, the engineering information to output entity information (referred to as "entity mapping" herein). For instance, when a set of input data is or includes unstructured data, the project server 120 may determine to process the unstructured data using the language model to generate the entity information. In cases where the engineering data has already been processed and stored in a data store (e.g., the project data store 216), the project server 120 may retrieve the entity information. In cases where the user/the engineering service 115 provided the engineering information in a mapped format, the project server 120 may verify the mapped format is proper; if so, the project server 120 may store it as entity information; if not, the project server 120 may process the unstructured and/or improperly mapped data using the language model to obtain the entity information.

In some cases, the entity information/mapping may include one or more data attributes of at least one entity (e.g., a first entity) of the plurality of entities. In some cases, the entity information/mapping may include a plurality of data attributes of the at least one entity. In some cases, the entity information/mapping may include at least one data attribute for each entity of a plurality of entities.

In some cases, the project server 120 may output, e.g., via a graphical user interface or an alert via a message service, the entity mapping to the user for visual verification and/or correction. In some cases, the verification and/or correction may supplement a training corpus of the language model.

Thus, the project server 120 may utilize the language model to handle unstructured or semi-structured data (e.g., text prompts, text input, text files, metadata, headers, code files, and the like) to extract entity-related information, and to generate a structured relationship between discrete data fields, files, records, or pointers to generate entities and relationships between entities (referred to as "language model relationships"). In some cases, the project server 120 may utilize the language model to check structured formats or to check for consistency between unstructured and structured data. In this manner, the language model may make inferences beyond the explicit specific relationships hard-coded by engineers in the project object. Thus, the language model of the project server 120 may increase accuracy or safety and increase efficiency of project development, testing, and iteration.

In some cases, the engineering information is unstructured information, and the entity information is structured information. Thus, the project server 120 may provide computationally tractable solutions even when presented with unstructured data.

In some cases, the project server 120 may query an ontological framework using the entity information/mapping. For instance, the project server 120 query the onto-logical framework for at least one entity (e.g., a first entity) to determine whether the ontological framework includes an entry (e.g., a node) for the at least one entity. If not, the project server 120 may report an error to the user (e.g., entity not recognized) and/or report to a project server engineer (e.g., entity not recognized by ontological framework). If so, the project server 120 may determine any associated relationships based on the ontological framework. Generally, an ontological framework may be a formal model that describes how entities exist and relate in the world. See FIG. 6 for additional details.

For instance, querying the ontological framework may determine a relationship between the first entity and at least a second entity of the plurality of entities. In some cases, the query may return a plurality of second entities that are associated with the first entity. In some cases, the query may be run for several first entities (e.g., separately, in parallel, or in series) and each of the first entities may have respective result sets of second entities. In this manner, the project server 120 may reference an external source of relationships to determine if an entity is omitted or (if included) not currently connected to entities already a part of a project object. The omitted or not-currently-connected entities may be automatically joined to a project object or recommended to a user for additional data, verification, and/or confirmation. Thus, omitted entities or not-yet-made relationships between entities may be formed in the project object, thereby increasing accuracy or safety, or reducing engineering time/resources.

In some cases, the ontological framework may verify inferences made may the language model. In some cases, the ontological relationships may be suggested to users for verification/confirmation. In some cases, e.g., where a user over-rides the ontological relationship, the project server 120 may require a user verification (e.g., to track the deviation from the ontological framework). In some cases, the deviation may be incorporated in custom ontological models (for that specific project object or for an organization).

In some cases, the ontological framework may be selected from a set of ontological frameworks. For instance, the project server 120 may receive the engineering information from an API and determine the engineering information is related to a first type of project (e.g., a rocket project) and not a second type of project (e.g., a moon base or race car); and select a rocket ontological framework (and not a moon base or race car ontological framework). In some cases, this selection process may be preset by organization settings, to reduce compute/time delays. In some cases, this may be run-time dependent (e.g., based on an associated project object) if in an organization develops projects across various technology domains.

In some cases, the project server 120 may generate an output based, at least in part, on the relationship between the first entity and the second entity. In some cases, the output may be a user alert, a user interface requesting additional information, a request for verification/confirmation and the like. In these cases, the project server 120 may inform the user of an omitted entity and/or omitted relationship between entities, and inform the user of the new entity/relationship or request confirmation or additional data. In some cases, the output may be a digital twin, a modification to a model-based systems-engineering diagram (MBSE diagram) that represents a state of the project object; and/or a conflict detection. As discussed herein, the digital twin may be generated based on, at least in part, based on inference (e.g., from the language model relationships) and/or ontological relationships (e.g., from the ontological framework), so that the digital twin includes the impact of the new entity and/or new relationships between entities. The modification of MBSE diagram may correspond to the new entity and/or new relationships between entities. As discussed herein, detection of a conflict between two or more: (i) system requirements; (ii) entities; and/or (iii) combinations of (i) and (ii).

In some cases, the output is for a project object, where the project object is a specific engineering project developing designed, developed, and built. In the case of a digital twin, the digital twin may enable faster iteration (for discrete entities and relationships between entities), simulated testing and verification, and the like. In the case of MBSE diagrams, the MBSE diagrams may document design versions and provide external stakeholders with a human-understandable formats of design and requirement verification. In the case of conflict detection, users may be alerted to the conflict so that the conflict may be resolved before, e.g., production, deployment, and the like, thereby reducing waste and/or increasing safety or compliance with requirements.

In some cases, the project object may be an aerospace vehicle (e.g., a satellite, a rocket, a plane, and the like). However, while examples of aerospace systems are depicted in the present disclosure, the systems and methods of the present disclosure could be used for any level of complex (or even simply) systems engineering tasks. For instance, the systems and methods of the present disclosure could be used for nautical systems (e.g., ships, boats, and the like), heavy equipment (e.g., boring systems, drilling systems, earth moving equipment, and the like), military systems (e.g., warships, aircraft carriers, submarines, tanks or other land vehicles), consumer electronics (e.g., mobile phones, televisions, computers, and the like), production facilities (e.g., oil and gas plants, chemical systems), and the like.

Generally, the relationship between the first entity and the second entity may be (1) an indication that the second entity has been omitted from a set of entitles associated with the project object, and/or (2) an indication that the second entity exists in the set of entities associated with the project object but that the relationship between the two entities has not been formally documented between the two entities. In this manner, project objects may be modified to include new entities or new relationships between entities that have not been hardcoded by users. In this manner, project development may be improved (e.g., faster design, higher accuracy, fewer conflicts).

In some cases, the relationship between the first entity and the second entity is automatically joined to a project object associated with the first entity. For instance, the relationship may be joined to a relationship information dataset (e.g., stored in project datastore 216) of the project object. The relationship information dataset may include relationships between entities, as indicated by users (e.g., hardcoded), as indicated by the language model relationships, and as indicated the ontological relationships. In some cases, the relationship information dataset is stored apart from the entities in the project datastore 216. In some cases, the relationship information dataset is stored in parts with respective entities in the project datastore 216 (e.g., in a record or database entry associated with an entity).

In some cases, the relationship between the first entity and the second entity is recommended to a user for confirmation to join the project object. In some cases, the project server 120 may transmit an alert (e.g., via a message service) to the user device 105 of the user. The alert may indicate the recommended relationship between the first entity and the second entity and any associated information (e.g., what input data triggered the alert).

In some cases, the project server 120 may cause a notification to be displayed to the user in a native environment. The notification may indicate the recommended relationship between the first entity and the second entity and any associated information (e.g., what input data triggered the alert). In some cases, the notification may be displayed in response to a user taking an action in the native environment. For instance, the notification may be displayed in response to a save or merge request that caused a data input to the project server 120 that triggered the recommendation.

In some cases, the project server 120 may cause a graphical user interface (e.g., in a web-based or mobile application) to display the recommended relationship between the first entity and the second entity. For instance, the graphical user interface may display a popup or notification indicating the recommendation and any associated information (e.g., what triggered the recommendation). In some cases, the recommended relationships may be displayed in a specific graphical user interface that groups all recommendations (e.g., based on users, groups, or entities).

In response to the user confirming the second entity as a new entity and/or a new relationship, the project server 120 may join the new entity or the new relationship to the project object. In some cases, the project server 120 may use the confirmation (or not) as feedback for further training of the language model.

In some cases, the relationship between the first entity and the second entity is presented to a user for additional data or data connectors. In this case, the presentation for additional data or data connectors may be displayed in addition to or separately from the recommendations discussed above. The presentation for additional data or data connectors may direct the user to provide a specific engineering artifact (e.g., a value, a record, a file, or a pointer), so that an attribute of the first or second entity may be populated. In response to a user providing the additional data or a data connector to the relevant engineering artifact, the project server 120 may update the first or second entity. In some cases, the project server 120 may process the new data using the language model and/or the ontological framework.

Project Server

Figure 2:
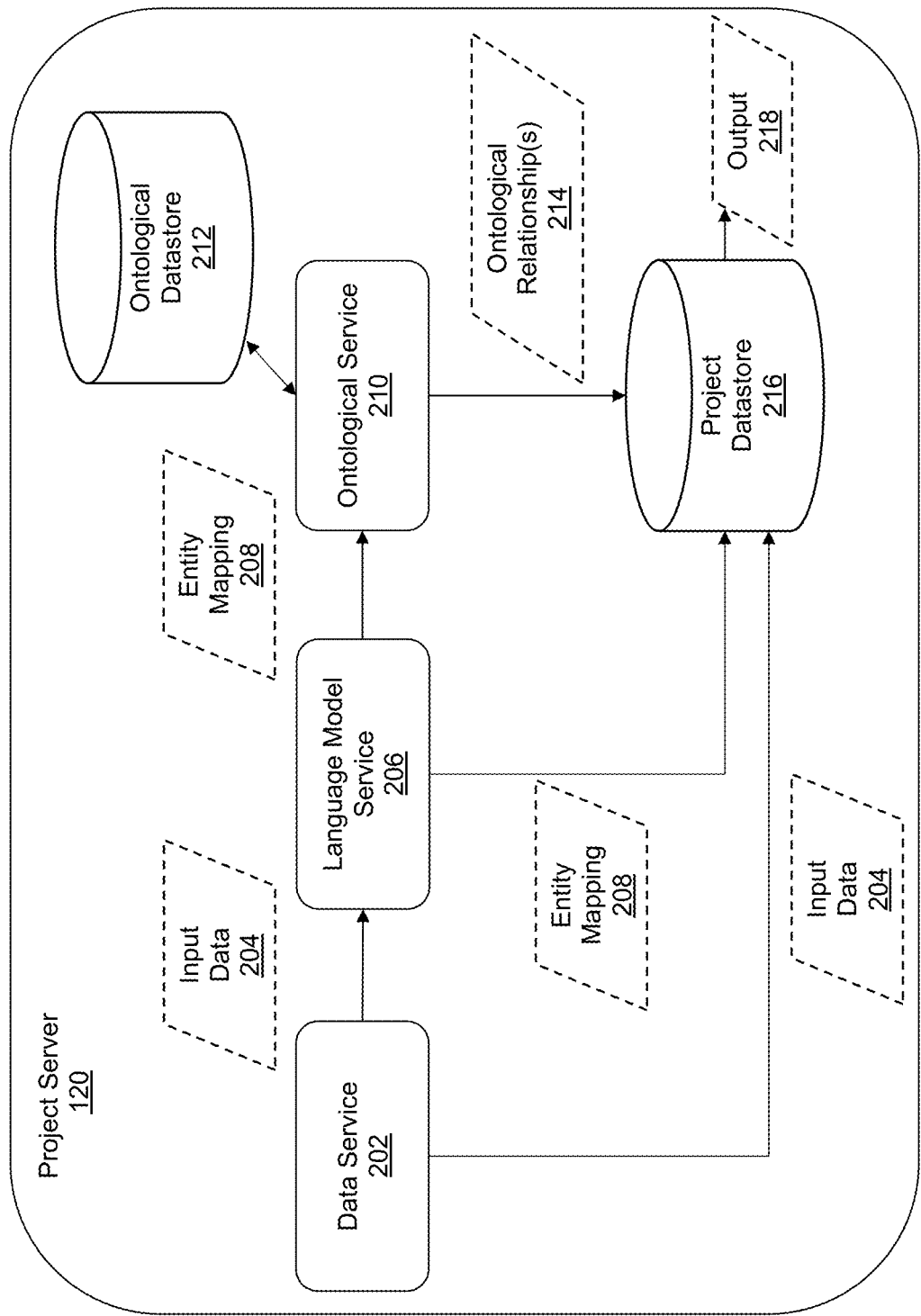
FIG. 2 depicts a block diagram schematically showing features of a project server for systems engineering using an ontological framework.

FIG. 2 depicts a block diagram 200 schematically showing features of a project server 120 for systems engineering using an ontological framework. The features of FIG. 2 may apply to any of FIGS. 1, 3, 4A-4B, 5, 6, 7, 8, 9, 10, and 11. The project server 120 may include a data service 202, a language model service 206, an ontological service 210, an ontological datastore 212, and a project datastore 216.

The data service 202 may obtain input data 204. For instance, data service 202 may manage graphical user interfaces to receive uploaded engineering information and/or interact with data connectors to native environments to receive engineering information (e.g., files or events). The data service 202 may store the input data 204 in the project datastore 216, e.g., after pre-processing for format and verification. The data service 202 may also transmit the input data 204 to the language model service 206.

The language model service 206 may process the input data 204 to generate entity mapping 208, as discussed herein. The language model service 206 may store the entity mapping 208 in the project datastore 216, e.g., automatically or after user verification/confirmation or additional data is provided. The language model service 206 may also transmit the entity mapping 208 to the ontological service 210.

The ontological service 210 may query an ontological framework from the ontological datastore 212 to determine ontological relationship(s) 214, as discussed herein. In some cases, the ontological datastore 212 may store a plurality of ontological frameworks. For instance, the ontological service 210 may retrieve a specific ontological framework and query the retrieved ontological framework to determine the ontological relationship(s) 214. The ontological service 210 may store the ontological relationship(s) 214 in the project datastore 216, e.g., automatically or after user verification/confirmation or additional data is provided.

The project datastore 216 may store and manage the various pieces of data over time, such that the current version of the project object is available, e.g., for the MSBE service, for digital twins, or for conflict detection. As discussed herein, the project server 120 may generate the output 218, such as requests for data, requests for user verification/confirmation, diagrams, digital twins, or conflict resolution.

Language Model Service

Figure 3:
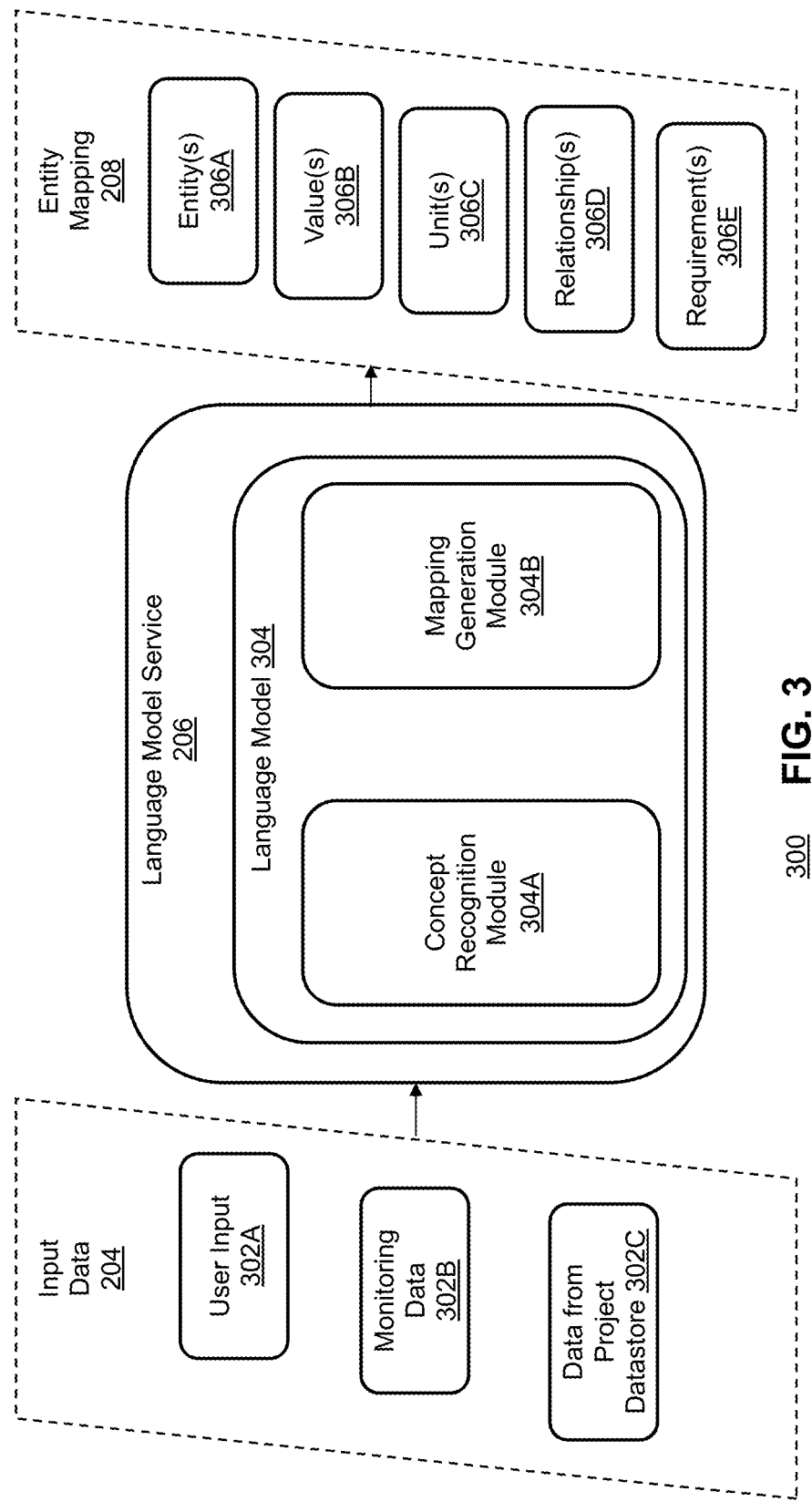
FIG. 3 depicts a block diagram schematically showing a language model service for systems engineering using an ontological framework.

FIG. 3 depicts a block diagram 300 schematically showing a language model service 206 for systems engineering using an ontological framework. The features of FIG. 3 may apply to any of FIGS. 1, 2, 4A-4B, 5, 6, 7, 8, 9, 10, and 11. The language model service 206 may include a language model 304. In some cases, the language model 304 may include a concept recognition module 304A and a mapping generation module 304B. The language model service 206 may receive input data 204 from various sources, such as user input 302A (e.g., text strings), monitoring data 302B (e.g., events in native environments), and/or data from project datastore 302C (e.g., text strings or events previously stored in project datastore 216). Thus, in some cases, the engineering information in the input data 204 may be obtained, at least in part, by monitoring actions of one or more users of the system.

The language model service 206 may process the input data 204 to determine an entity mapping 208. The entity mapping 208 may include entity(s) 306A, value(s) 306B, unit(s) 306C, relationships 306D, and/or requirements 306E.

In some cases, the language model 304 may be a natural language processing (NLP) model. The NLP model may process different types of engineering information including a set of machine-readable text, engineering specifications, metadata, code, and the like. In some cases, the NLP model may be configured to output: (a) one or more entities of the plurality of entities and (b) one or more tags associated with the one or more entities of the plurality of entities.

For instance, the language model 304 may be a large language model (LLM), a transformer model or transformer-based deep neural network model, such as a bidirectional encoder representations from transformers (BERT). In some cases, the language model 304 may include more than one transformer model, such as specifically designed BERTS on specific datasets. For instance, the specifically designed BERTS may be selected based on a type of project object associated with the input data 204. The specifically designed BERTS may include an aerospace-related BERT (such as Space BERT), an automotive BERT, a military BERT, and the like. In some cases, the language model 304 may be trained using customer use (e.g., events from monitoring data, examples from data from the project datastore 216, curated training sets, and the like. For instance, the LLM may be a LLM that receives designed prompts to extract entities and relationships from text. In some cases, the LLM may be tuned and/or modified based on a specific corpus of text, such an aerospace-related LLM, an automotive LLM, a military LLM, and the like.

In some cases, the concept recognition module 304A may identify the entity(s) 306A, the value(s) 306B, and the unit(s) 306C. In some cases, the mapping generation module 304B may associate specific values the value(s) 306B to specific units of unit(s) 306C (e.g., as pairs). Each pair may be a data attribute of an entity. In some cases, the mapping generation module 304B may associate the pairs to entity(s) 306A. In some cases, associated of pairs and pairs to entities may be done by tags. A tag may include information indicative of (i) a name of an entity (e.g., a first entity); and/or (ii) respective data values corresponding to each of the one or more data attributes.

In some cases, the mapping generation module 304B may determine relationships 306D between specific pairs of entities of entity(s) 306A. See, e.g., FIGS. 4B and 5. In these cases, the relationships 306D may be language model relationships.

In some cases, the concept recognition module 304A may identify requirements 306E from the input data 204. The requirements 306E may generate an entity of the entity(s) 306A as a requirement entity. See, e.g., FIG. 4B.

Example Input Data and Requirements

Figure 4B:
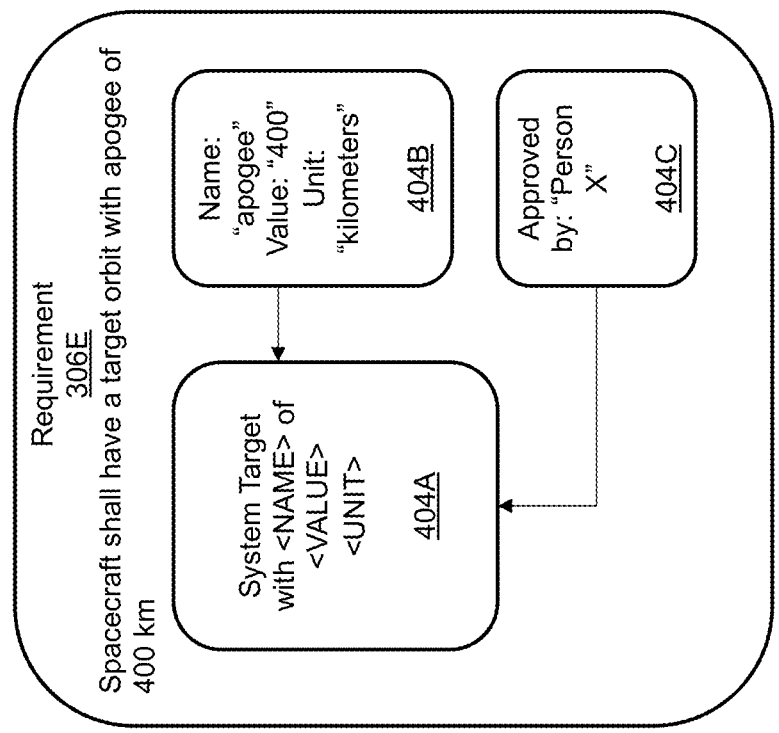
FIGS. 4A and 4B depict block diagrams schematically showing exemplary input data types and requirements.
Figure 4A:
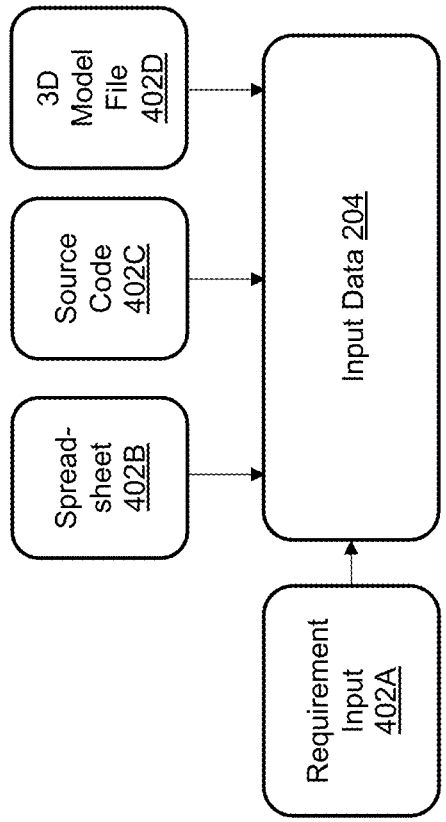

FIGS. 4A and 4B depict block diagrams 400A and 400B schematically showing exemplary input data types and requirements. The features of FIGS. 4A and 4B may apply to any of FIGS. 1, 2, 3, 5, 6, 7, 8, 9, 10, and 11.

Diagram 400A may depict exemplary input data types, such as a requirement input 402A (e.g., structured or unstructured text that a user indicates is a requirement), a spreadsheet 402B (e.g., semi-structured data), a source code 402C (e.g., a file), a 3D model file 402D (e.g., a copy of the file or a pointer to the file). Each of these input data types may be uploaded by a user or provided by a data connecter.

Diagram 400B may depict an exemplary requirement 306E. The requirement 306E may have a data structure 404A that associates data attributes 404B to fields of the data structure 404A, and associates a verification 404C (if present) by a user (by storing, e.g. a user ID).

Text Prompt Conversion

Figure 5:
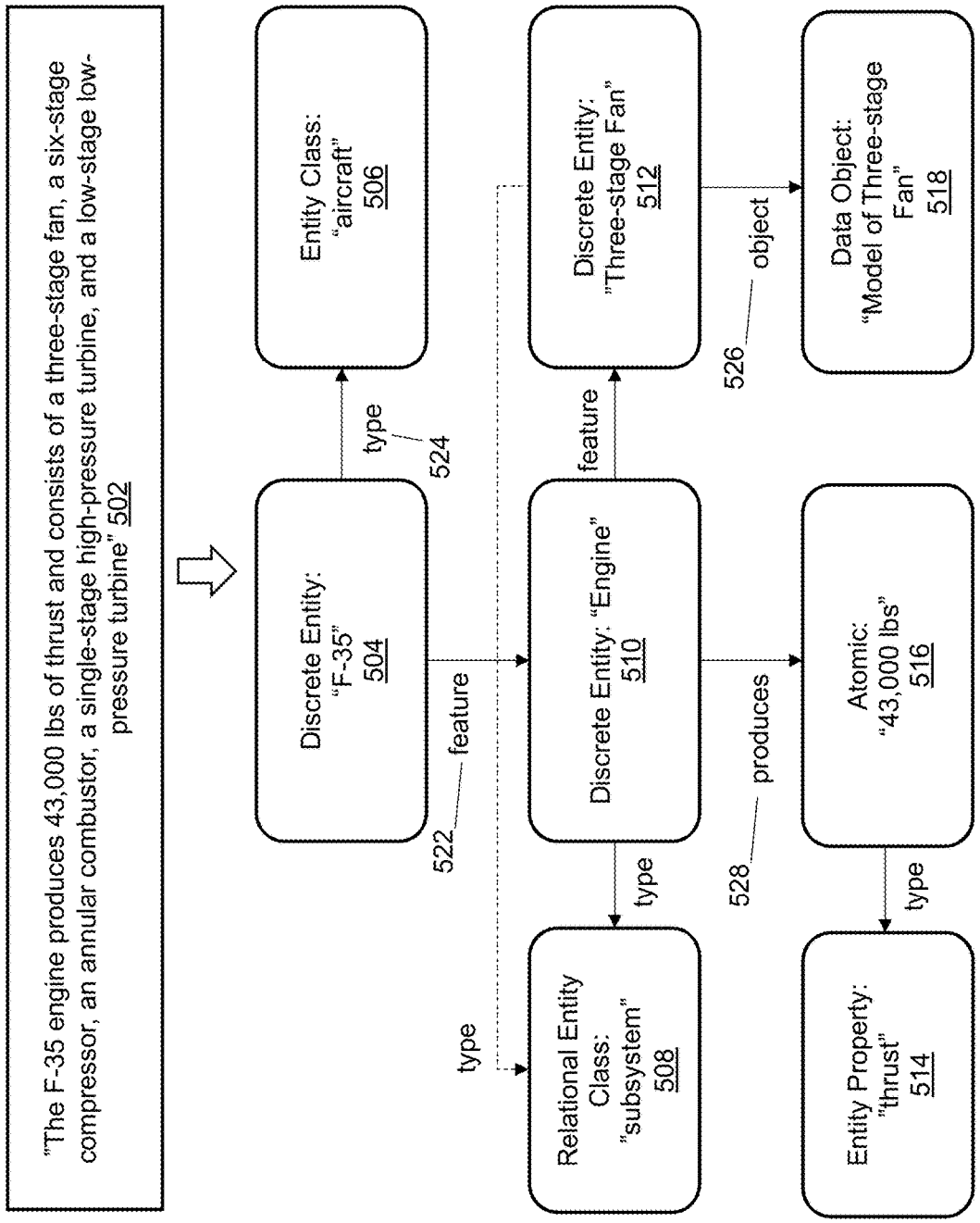
FIG. 5 depicts a block diagram schematically showing text prompt conversion using a language model and an ontological service.

FIG. 5 depicts a block diagram schematically showing text prompt conversion using a language model service 206 and an ontological service 210. The features of FIG. 5 may apply to any of FIGS. 1, 2, 3, 4A-4B, 6, 7, 8, 9, 10, and 11. In some cases, the language model service 206 may receive an unstructured text prompt 502 and generate at least some of a plurality of entities 504-518, and at least some of relationships 522-526 between respective entities of the plurality of entities 504-518. In some cases, the ontological service 210 may generate at least some of a plurality of entities 504-518, and at least some of relationships 522-526 between respective entities of the plurality of entities 504-518, as discussed herein.

The entities 504-518 may include one or combinations of: a discrete entities 504, 510, 512, entity class 506, relational entity class 508, entity property 514, atomics 516, and data object 520. Each of the relationships may connect two (or more entities) with a relationship style, such as relationship feature 522, relationship type 524, relationship object 526, and relationship produces 528.

Ontological Framework

Figure 6:
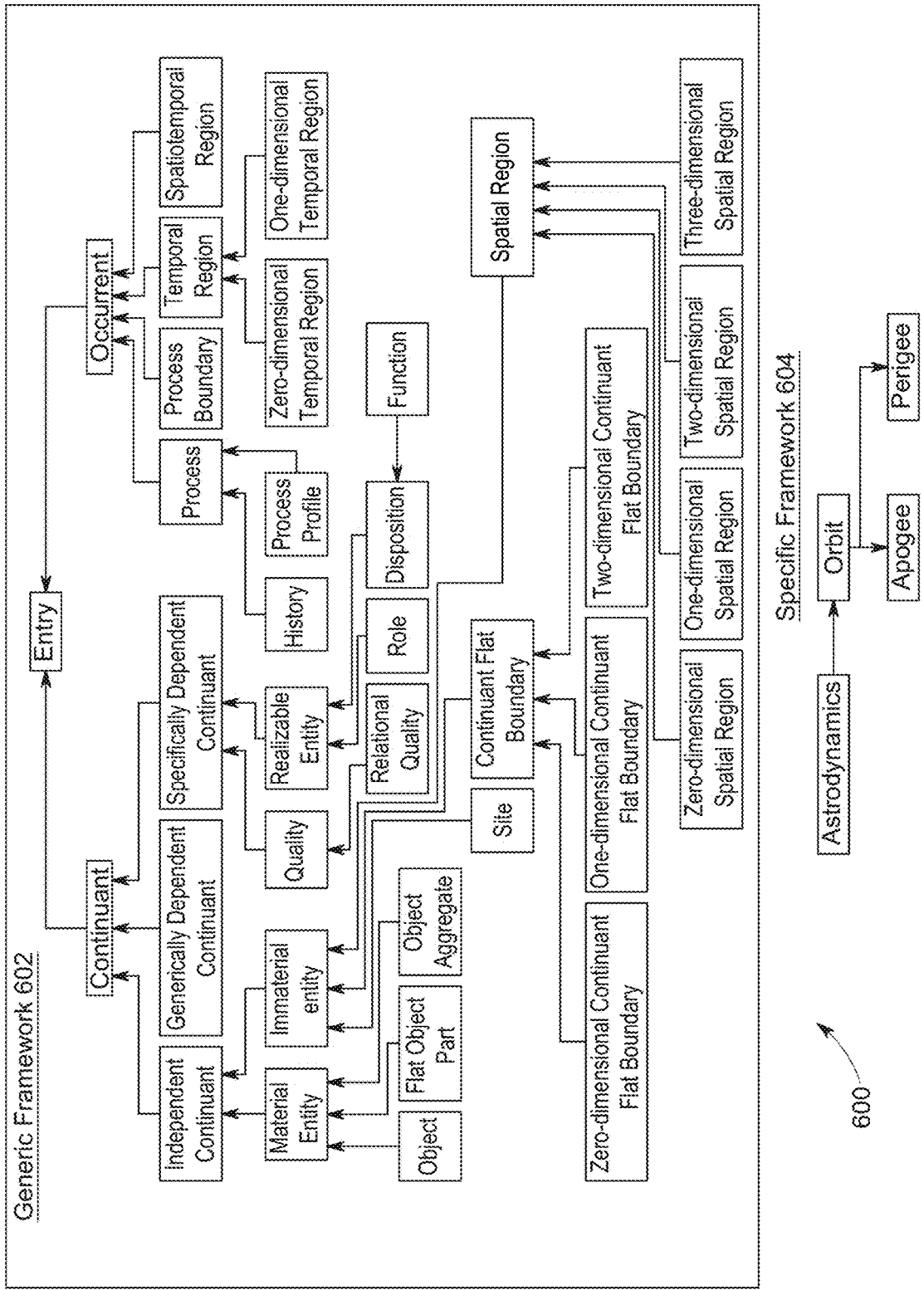
FIG. 6 depicts a block diagram schematically showing ontological frameworks.

FIG. 6 depicts a block diagram 600 schematically showing ontological frameworks 602 and 604. The features of FIG. 6 may apply to any of FIGS. 1, 2, 3, 4A-4B, 5, 7, 8, 9, 10, and 11. A generic framework 602 may depict how physical, temporal, or logical relationships may be structured in a hierarchy of relationships between entities. An example of a generic framework may be the common core ontology or the basic formal ontology. A specific framework 604 may depict a hierarchy of relationships between entities in a specific domain, such as aerospace, astrodynamics, automotive and the like.

In some cases, to query the ontological framework using the entity information/mapping, the project server 120 may: search the ontological framework for a matching entry of the ontological framework to a query entity (e.g., a first entity); in response to determining a matching entry, determine at least one related entry in the ontological framework; and determine a first one of the at least one related entry as a matching entity (e.g., a second entity).

In some cases, the ontological framework may be a graph of nodes and edges. For instance, the graph may be a memgraph database, a Neptune database, and the like. The nodes may correspond to potential entities (e.g., that exist in the world as physical, temporal, or logical entities). The edges may correspond to spatial, temporal, and/or logical relationships between potential entities.

In some cases, to search the ontological framework for the matching entry of the ontological framework to the query entity (e.g., a first entity), the project server 120 may: recursively traverse branches of the nodes and the edges; retrieve an entry at each node; determine whether the entry satisfies match condition for the first entity; and if the match condition is satisfied, return the entry as the matching entry. If the match condition is not satisfied, the project server 120 may continue traversing branches until all nodes have been searched.

To determine at least one related entry in the ontological framework, the project server 120 may obtain entries for all nodes that are on a same level as the matching node, if any; all relationships between the same level nodes, if any; all nodes that are nested below the matching node, if any; all relationships between the nested nodes, if any (collectively, "query result set"). In this manner, the project server 120 may return a query result set, as indicated by the ontological framework.

In some cases, the project server 120 may determine whether the project object includes each of the entities in the query result set. If project server 120 determines that the project object omits one or more entities in the query result set, the project server 120 may determine those entities as omitted entities.

In some cases, the project server 120 may determine whether the project object includes each of the relationships between entities in the query result set. If project server 120 determines that the project object omits one or more relationships in the query result set, the project server 120 may determine those relationships as omitted relationships (as between their respective entities).

Thus, in some cases, the project server 120 may also generate an omitted result set. The omitted result set may include the omitted entities and omitted relationships. The project server 120 may use the omitted result set to automatically join new entities or new relationships to the project object, or recommend new entities or new relationships to be joined to the project object.

Example Data Flow

Figure 7:
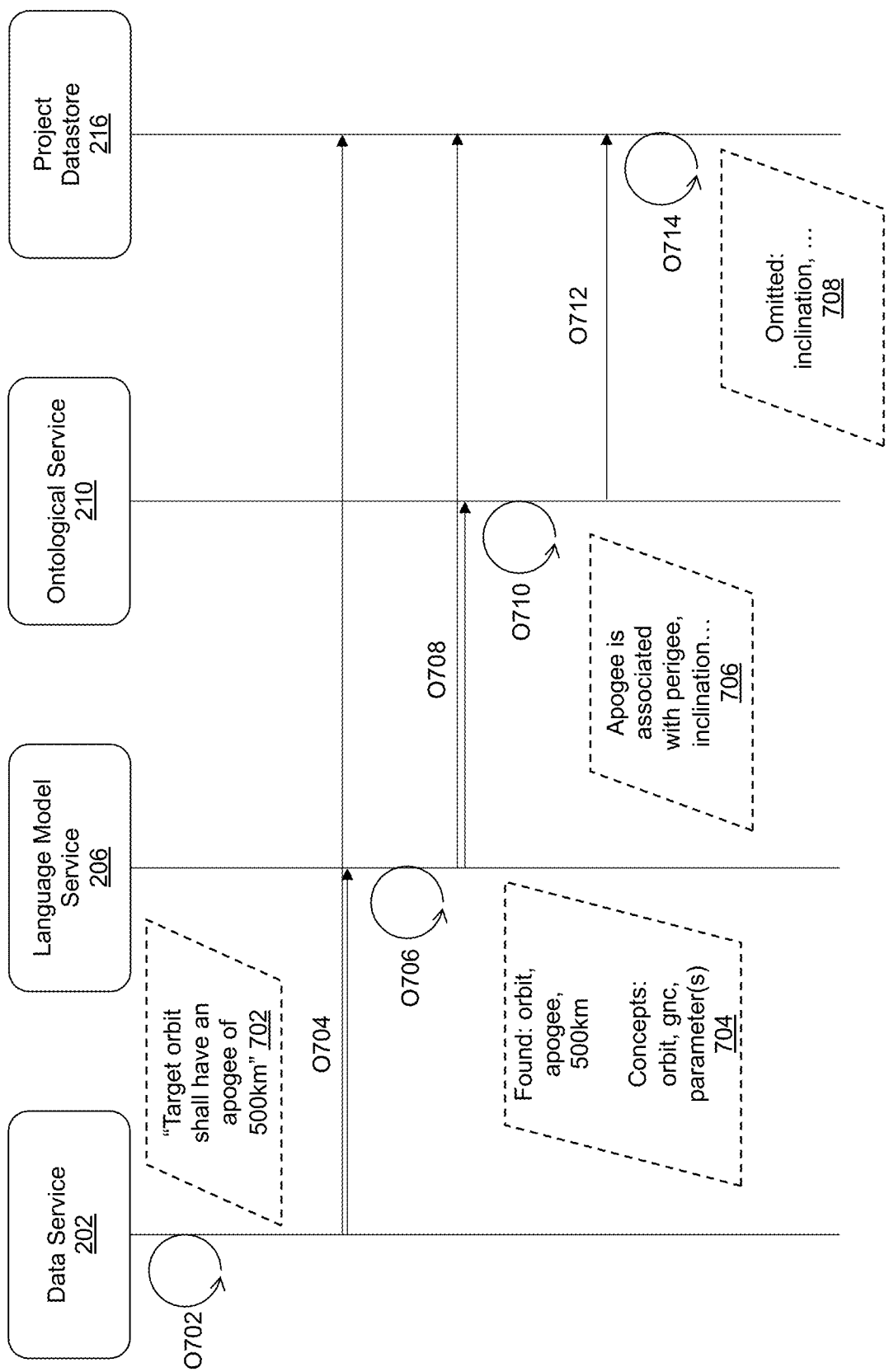
FIG. 7 depicts a dataflow diagram for systems engineering using an ontological framework.

FIG. 7 depicts a dataflow diagram 700 for systems engineering using an ontological framework. The features of FIG. 7 may apply to any of FIGS. 1, 2, 3, 4A-4B, 5, 6, 8, 9, 10, and 11. The operations of the dataflow diagram 700 may be performed by the project server 120.

At operation O702, the data service 202 may obtain input data 702. For instance, the data service 202 may obtain events from native environments or text strings from users, via a graphical user interface, as discussed herein. At operation O704, the data service 202 may transmit the input data 702 to the language model service 206 and/or the project datastore 216. The language model service 206 may receive the input data 702.

At operation O706, the language model service 206 may process the input data 702 through the language model 304 to obtain an entity mapping 704. For instance, the language model service 206 may determine the entity(s) 306A, value(s) 306B, unit(s) 306C, relationships 306D, and/or requirements 306E, as discussed herein. At operation O708, the language model service 206 may transmit the entity mapping 704 to the ontological service 210 and/or the project datastore 216. The ontological service 210 may receive the entity mapping 704.

At operation O710, the ontological service 210 may query an ontological framework using the entity mapping 704 to obtain a query result set 706. For instance, the ontological service 210 may search for matching entities to entities of the entity mapping 704 and return a query result set 706, as discussed herein. At operation O712, the ontological service 210 may transmit the query result set 706 to the project datastore 216.

At operation O714, the project server 120 may determine an omitted result set 708 based on the query result set 706. For instance, the project server 120 may search the project datastore 216 to determine if the project object omits any entity(s) included in the query result set 706, and/or omits any relationship(s) between entities of the included in the query result set 706. If any entities or relationships are omitted, the project server 120 may generate the omitted result set 708 and perform actions for the omitted result set 708, as discussed herein.

Omitted Relationship Identification

Figure 8:
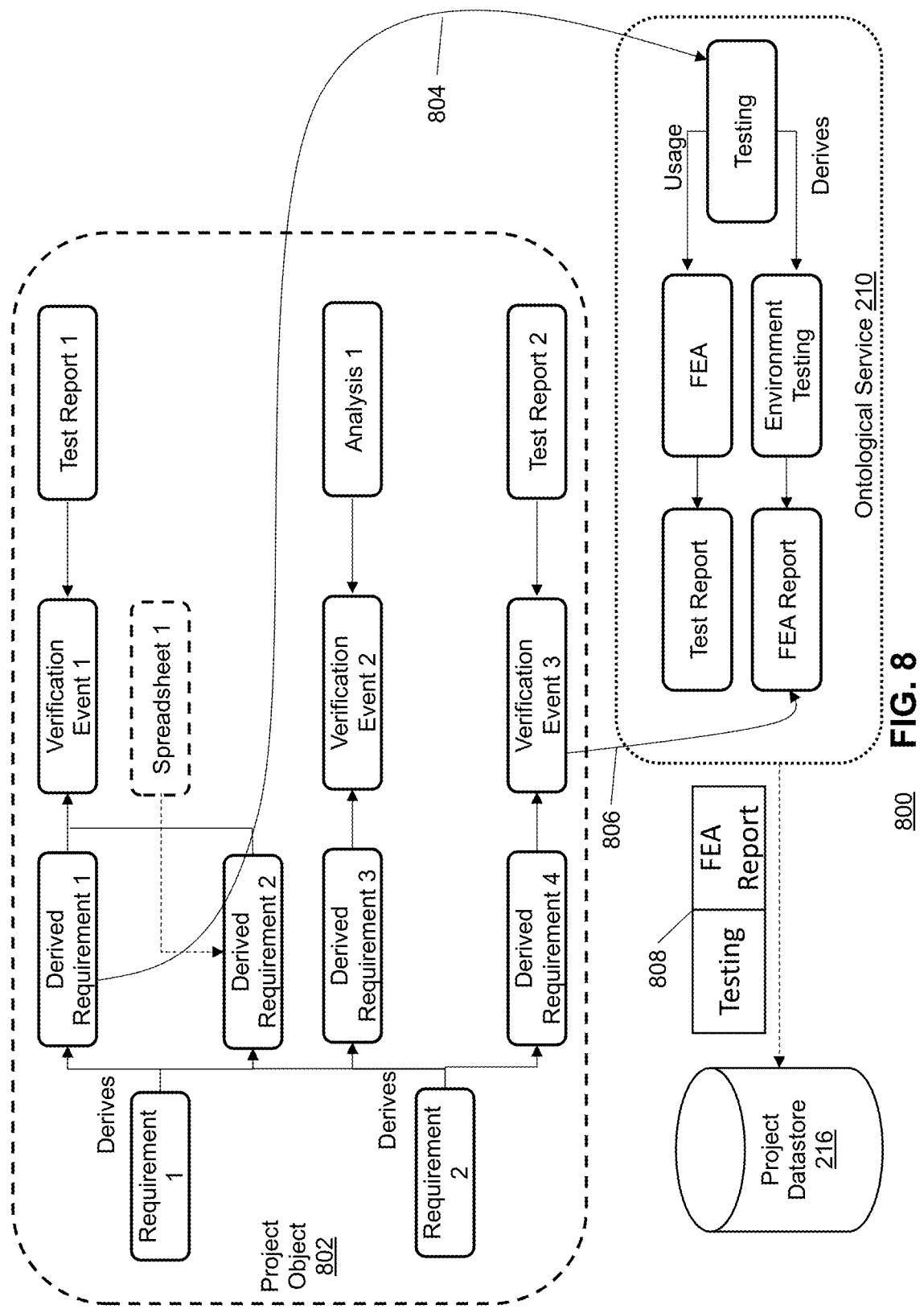
FIG. 8 depicts a block diagram schematically showing omitted relationships identified using an ontological framework.

FIG. 8 depicts a block diagram schematically showing omitted relationships identified using an ontological framework. The features of FIG. 8 may apply to any of FIGS. 1, 2, 3, 4A-4B, 5, 6, 7, 9, 10, and 11. The operations of the block diagram 800 may be performed by the project server 120. In some cases, in response to a project object 802 having been updated based on user inputs and/or monitoring events (e.g., test report 2 is input to data service 202), the project server 120 may perform an omitted relationship identification process.

To perform the omitted relationship identification process, the project server 120 may generate derived requirement 4 and verification event 3, based on the test report 2 being input to the data service 202, and join the derived requirement 4 and verification event 3 to the project object 802. In response to the derived requirement 4 and verification event 3 being joined to the project object 802, the project server 120 may invoke the ontological service 210 to determine if there are any omitted entities or relationships. In this case, after querying the ontological framework, the ontological service 210 determines that two entities (e.g., verification 3 and derived requirement 1) are related by matching entries 804 and 806 in the ontological framework. In response to determining the matching entries 804 and 806 are related in the ontological framework, the ontological service 210 may determine whether the two entities (e.g., verification 3 and derived requirement 1) have a relationship in the project object 802. In this case, the two entities do not have a relationship, so the ontological service 210 determines that the project object has a missing relationship 808. In this case, the ontological service 210 may automatically join or recommend the missing relationship 808 to be joined to the project object (e.g., by updating the project datastore 216).

Conflict Identification

Figure 9:
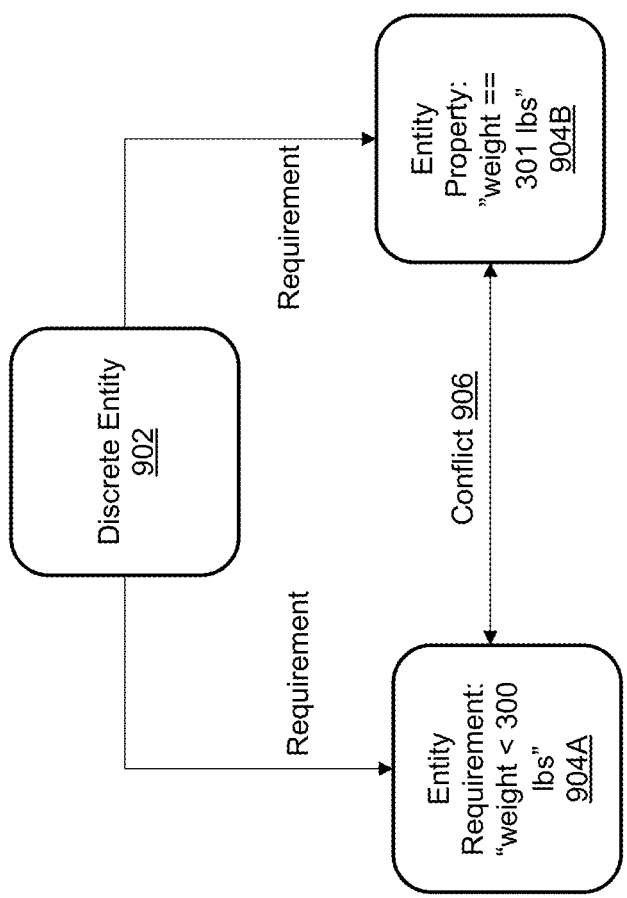
FIG. 9 depicts a block diagram schematically showing conflict identification using an ontological framework.

FIG. 9 depicts a block diagram 900 schematically showing conflict identification using an ontological framework. The features of FIG. 9 may apply to any of FIGS. 1, 2, 3, 4A-4B, 5, 6, 7, 8, 10, and 11. The operations of the block diagram 900 may be performed by one or more of the systems of environment 100, such as the project server 120 or any one of the engineering service(s) 115. In some cases, in response to a project object having been updated based on outputs from the ontological service 210, the project server 120 may perform a conflict identification process.

To perform the conflict identification process, the project server 120 may iterate (in parallel or in series) through each discrete entity (such as discrete entity 902) of the project object (such as project object 802). For each discrete entity 902, the project server 120 may compare an entity requirement 904A with any associated entity properties or other requirements (such as entity property 904B). The project server 120 may determine associated entity properties or other requirements (e.g., for a same type of unit) based on any entity mappings and/or ontological relationships associated with the entity 902.

To identify a conflict, the project server 120 may determine a logical expression for the entity requirement 904A and whether any entity properties or other requirements fail to satisfy the logical expression. In the case of entity properties, a logical expression may be an arbitrarily complex logical operator for value(s) that returns true or false based on populated value(s) from the entity properties. In the case of other requirements, a logical expression may be an arbitrarily complex logical operator for a second logical expression of the other requirement that returns true or false.

In the case that any entity properties or other requirements fail to satisfy the logical expression, the project server 120 may identify a conflict. In some cases, in response to identifying a conflict, the project server 120 may prompt a user to investigate/resolve the conflict. In some cases, the project server 120 may suggest a new requirement for a failed other requirement.

In the example depicted in block diagram 900, the entity property 904B may be associated with the discrete entity 902 using the ontological framework. In this manner, the conflict was identified using the ontological framework that was not provided by user devices 105 or engineering services 115. Thus, an associated engineering project detected and caused a process to resolve a conflict, thereby increasing accuracy and safety, and reducing engineer development costs/time.

Generate and Use Digital Twin

Figure 10:
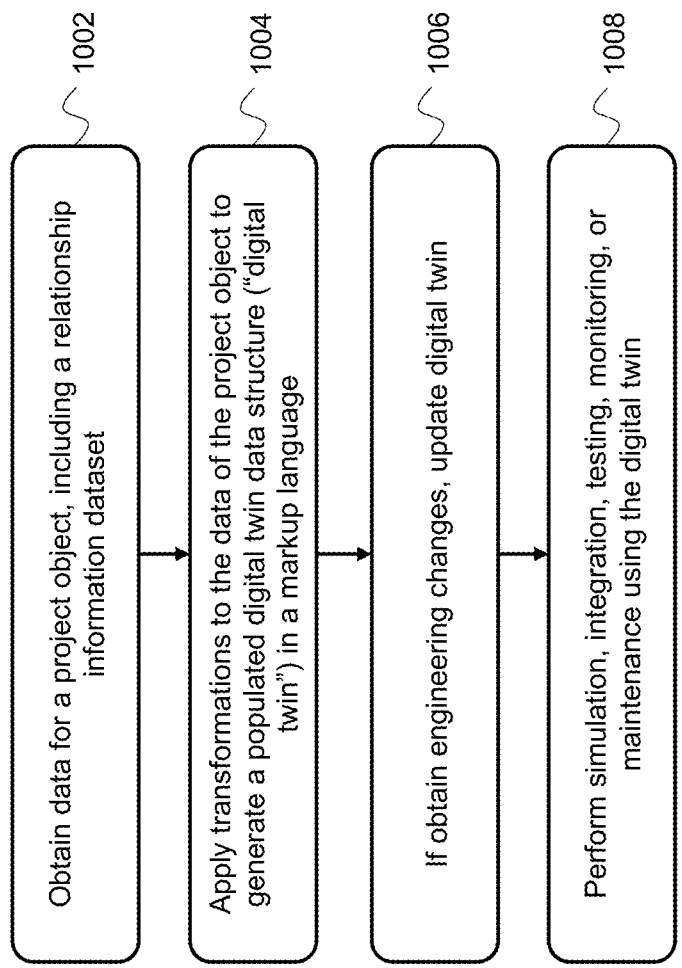
FIG. 10 depicts a flowchart for generating and using a digital twin.

FIG. 10 depicts a flowchart 1000 for generating and using a digital twin. The features of FIG. 10 may apply to any of FIGS. 1, 2, 3, 4A-4B, 5, 6, 7, 8, 9, and 11. The operations of the flowchart 1000 may be performed by one or more of the systems of environment 100, such as the project server 120 or any one of the engineering service(s) 115.

At block 1002, the project server 120 may obtain data for a project object, including a relationship information dataset. For instance, the project server 120 may select and retrieve entity(s) of a project object. For instance, the project server 120 may select all requirements; design models, documents, or references (collectively "designs"); and/or validation, testing, and/or simulation models (collectively, "models") for each entity associated with the project object from the project datastore 216. In some cases, the project server 120 may determine whether there are sufficient entities to generate a digital twin. In some cases, the project server 120 may determine whether at least one requirement, at least one design, and/or at least one model exist for each entity. In some cases, based on the type of project object, the project server 120 may determine whether there are at least one requirement, at least one design, and/or at least one model exist for each entity, for each type of technical discipline the entity interacts with or has. A technical discipline may be electrical, mechanical, software, chemical, and the like. In some cases, the project server 120 may determine whether there is at least one verification entity (or aspect of an entity) for each entity associated with the project object. In each of the foregoing, if the project server 120 determines there are sufficient entities for the project object, the project server 120 may proceed with generation of the digital twin. In each of the foregoing, if the project server 120 determines there are not sufficient entities for the project object, the project server 120 may not proceed with generation of the digital twin. In this case, the project server 120 may indicate to a user (e.g., via message or native environment notification) that at least entity or aspect is missing and, optionally, a recommendation as to the missing entity or aspect.

In some cases, the project server 120 may also determine whether there is sufficient real-world telemetry data for entities of the project object. In some cases, the real-world telemetry data may be used as feedback into the designs and/or models. In some cases, the real-world telemetry data may be used to compare against simulated validation data. In some cases, the real-world telemetry data may be used to confirm the simulation. In some cases, the real-world telemetry data may be stored with or in association to specific entities. In some cases, the real-world telemetry data may be sourced from an exported set of observed results from a test apparatus, or fed directly into the project server 120 system from sensor (e.g., a networked IoT device) that can publish telemetry directly into the project server 120 system.

At block 1004, the project server 120 may apply transformations to the data of the project object to generate a populated digital twin data structure ("digital twin") in a markup language. In some cases, the digital twin data structure may be a SysML v2 compliant data structure. For instance, the project server 120 may select and convert, in accordance with the transformations, requirements, designs, and/or models into specific parts of a digital twin data structure (which may be a template that is populated or modified, in accordance with the transformations).

In some cases, the transformations may be generated based on, at least in part: (a) historical user interactions and/or event monitoring; and (b) a NLP model associating different entities, based on shared features, that were not labeled as related. In some cases, historical user interactions and/or event monitoring may indicate certain entities are associated based on how users interact with different entities of the native environments and/or the data service 202/project server 120. These types of associations may be latent relationships that are not documented by users, but nevertheless indicate related systems. As an example, a user may make input on a spreadsheet associated with a first entity that indicates a link to a CAD program file associated with a second entity.

In some cases, the NLP model may determine two entities share features, such as common concepts or words but the two entities may not labeled as related. In this case, the NLP model may infer the entities are related because of the shared features, even if a relationship does not exist in the project object. As an example, a user may interact with a CAD model of a wing and interact with an airflow model over a wing. The NLP model may identify that the two entities (the CAD model and the airflow model) share a feature (the wing).

At block 1006, the project server 120 may, if engineering changes are obtained, update the digital twin. For instance, the project server 120 may obtain new input data; and update the project object. In response to the project object being updated, the project server 120 may update the digital twin based on the underlying changes to the project object.

At block 1008, the project server 120 may perform simulation, integration, testing, monitoring, or maintenance using the digital twin. For instance, the project server 120 may simulate an action (e.g., take off) using the digital twin (a "simulation") for the project object (e.g., an aircraft); and compare the simulation with real-world telemetry data of a real-word version of the project object. In this manner, the project server 120 may compare the expectation of the simulation or design with the real-world telemetry data. This comparison may be used to confirm (e.g., if requirements are satisfied) or enable updates (e.g., if requirements are not met) to the design/models associated with the project object. After confirmation or updates, a new simulation may be run (e.g., against the known performance) to determine different or harder test situations, thereby extending operational capability of a project object. As an example, telemetry captured from the test flight of an aircraft (e.g., an F16 aircraft) may include load stresses on a wing and flow through a jet engine. The simulation (using the digital twin) and designs/models (of the project object) may expect a correlation between thrust at takeoff at an angle of attack and wing stress, and the telemetry may be compared against the prediction (in the simulation or design/models) to then confirm or update the designs/models. After updating or confirming the designs/models with the telemetry and/or the comparison result, a new simulation may be run against known performance to determine more extreme stress cases and extend the aircraft's performance envelope.

MBSE Service and Diagram

Figure 11:
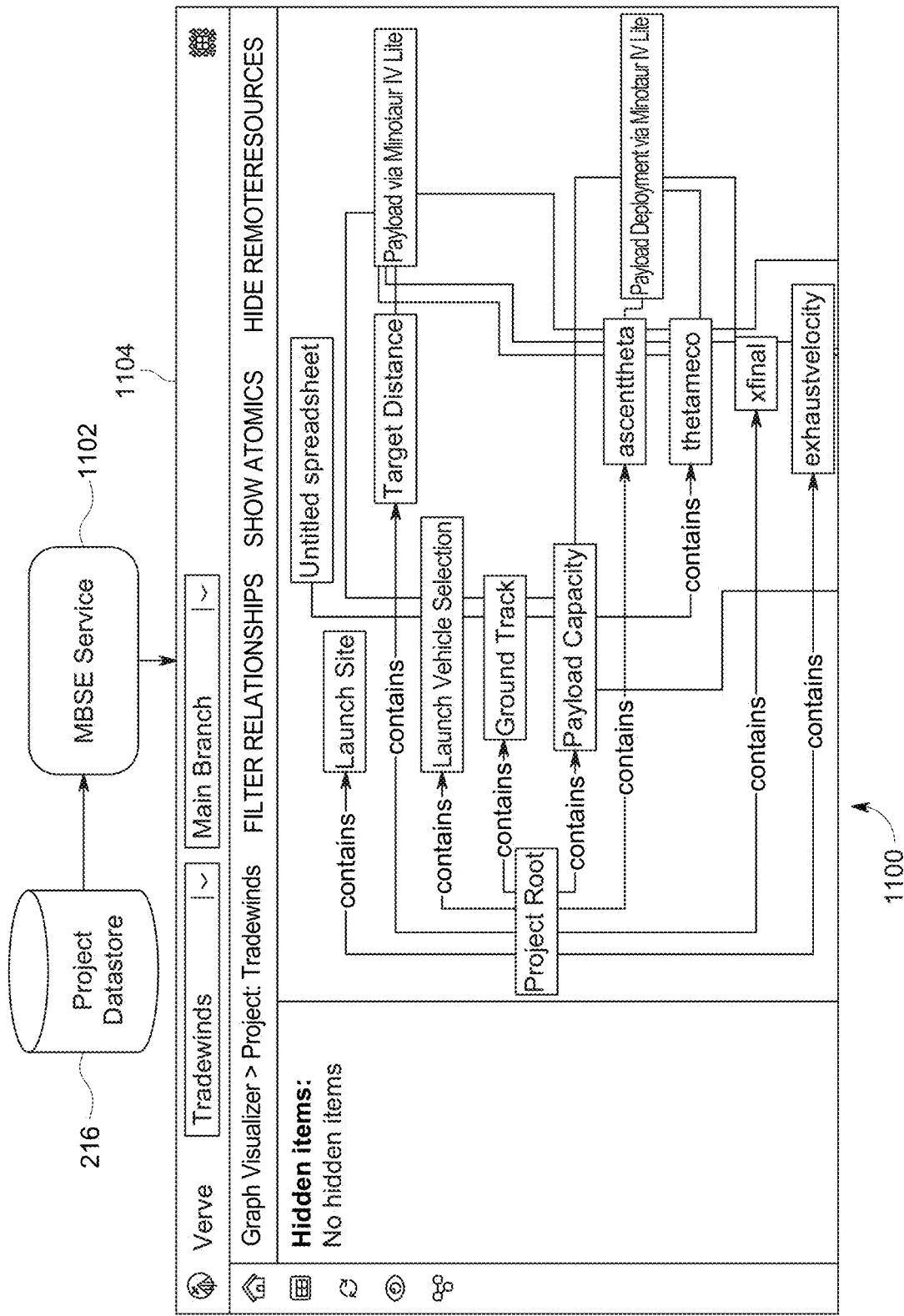
FIG. 11 depicts a graphical user interface for a model-based systems-engineering (MBSE) diagram generated by a MBSE service.

FIG. 11 depicts a block diagram 1100 for a model-based systems-engineering (MBSE) service 1102 and a MBSE diagram 1104. The features of FIG. 11 may apply to any of FIGS. 1, 2, 3, 4A-4B, 5, 6, 7, 8, 9, and 10. The operations of the diagram 1100 may be performed by the MBSE service 1102, which may be a part of the project server 120 or any one of the engineering service(s) 115.

The MBSE service 1102 may obtain data from the project datastore 216. For instance, the MBSE service 1102 may obtain filters or parameters (e.g., to a subsystem or process); determine entities based on the filters or parameters; and obtain data for those entities. The MBSE service 1102 may then generate a graphic 1104 based on the data for those entities (e.g., a subset of all entities of the project object). The graphic 1104 may graphically represent at least a subset of the plurality of entities for the project object. The graphic 1104 may display a hierarchy of entities and their relationships.

Computer System

Figure 12:
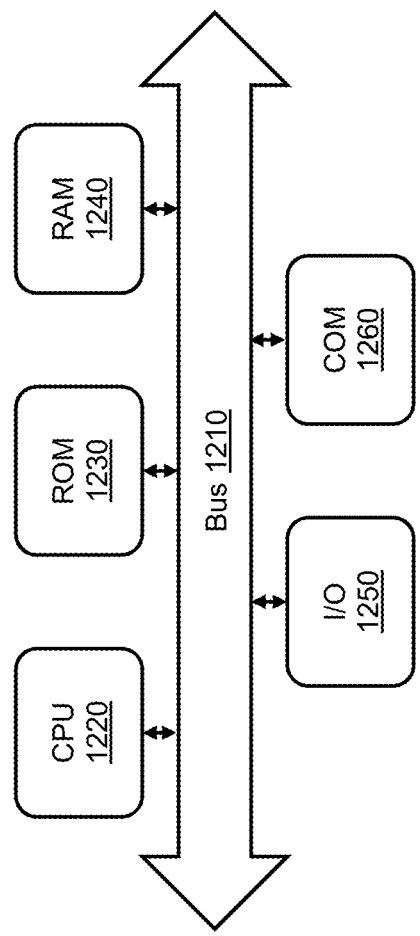
FIG. 12 depicts an example system that may execute techniques presented herein.

FIG. 12 depicts an example system that may execute techniques presented herein. FIG. 12 is a simplified functional block diagram of a computer that may be configured to execute techniques described herein, according to exemplary cases of the present disclosure. Specifically, the computer (or "platform" as it may not be a single physical computer infrastructure) may include a data communication interface 1260 for packet data communication. The platform may also include a central processing unit ("CPU") 1220, in the form of one or more processors, for executing program instructions. The platform may include an internal communication bus 1210, and the platform may also include a program storage and/or a data storage for various data files to be processed and/or communicated by the platform such as ROM 1230 and RAM 1240, although the system 1200 may receive programming and data via network communications. The system 1200 also may include input and output ports 1250 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of +10% in a stated value.

The term "exemplary" is used in the sense of "example" rather than "ideal." As used herein, the singular forms "a," "an," and "the" include plural reference unless the context dictates otherwise.

Examples

Exemplary embodiments of the systems and methods disclosed herein are described in the numbered paragraphs below.

A1. A system for systems engineering using an ontological framework, the system comprising:
 at least one memory configured to store computer-readable instructions; and
 at least one processor configured to execute the computer-readable instructions to perform operations, wherein the operations include:
  receive, via an input graphical user interface or one or more data connectors, engineering information, wherein the engineering information includes data for at least one entity of a plurality of entities;
  process, using a language model, the engineering information to output entity information, wherein the entity information includes one or more data attributes of a first entity of the plurality of entities;
  query an ontological framework using the entity information, wherein querying the ontological framework determines a relationship between the first entity and a second entity of the plurality of entities; and
  generate an output based, at least in part, on the relationship between the first entity and the second entity.

A2. The system of A1, wherein the relationship between the first entity and the second entity is (a) automatically joined to a project object associated with the first entity, (b) recommended to a user for confirmation to join the project object, or (c) presented to a user for additional data or data connectors.

A3. The system of any of A1-A2, wherein, to query the ontological framework using the entity information, the operations further include: searching the ontological framework for a matching entry of the ontological framework to the first entity; in response to determining a matching entry, determining at least one related entry in the ontological framework; and determining a first one of the at least one related entry as the second entity.

A4. The system of A3, wherein the ontological framework is a graph of nodes and edges.

A5. The system of A4, wherein the nodes correspond to potential entities.

A6. The system of A4, wherein the edges correspond to spatial, temporal, and/or logical relationships between potential entities.

A7. The system of A4, wherein searching the ontological framework for the matching entry of the ontological framework to the first entity includes: recursively traverse branches of the nodes and the edges; retrieving an entry at each node; determining the entry satisfies match condition for the first entity; and returning the entry as the matching entry.

A8. The system of any of A1-A7, wherein the relationship between the first entity and the second entity is joined to a relationship information dataset for a project object, wherein, based on the relationship information dataset, the operations further include one or more of the following: (1) generate a digital twin that represents the project object; (2) modify a model-based systems-engineering diagram (MBSE diagram) that represents a state of the project object; and (3) detect a conflict between two or more: (i) system requirements; (ii) entities; and/or (iii) combinations of (i) and (ii).

A9. The system of A8, wherein, to generate the digital twin, the operations further include: apply transformations to the data of the project object to generate a populated digital twin data structure in a markup language.

A10. The system of A9, wherein the transformations are generated based on, at least in part: (a) historical user interactions and/or event monitoring; and (b) a NLP model associating different entities, based on shared features, that were not labeled as related.

A11. The system of any of A1-A10, wherein the engineering information is unstructured information, and the entity information is structured information.

A12. The system of any of A1-A11, wherein the output is for a project object, and the project object is an aerospace vehicle.

A13. The system of any of A1-A12, wherein the language model comprises a natural language processing (NLP) model, and the entity information further includes a tag including information indicative of (i) a name of the first entity; and/or (ii) respective data values corresponding to each of the one or more data attributes.

A14. The system of A13, wherein the engineering information includes a set of machine-readable text.

A15. The system of A13, wherein the engineering information includes engineering specifications.

A16. The system of A13, wherein the engineering information is obtained, at least in part, by monitoring actions of one or more users of the system.

A17. The system of A13, wherein the NLP model comprises a transformer-based deep neural network model.

A18. The system of A13, wherein the NLP model is configured to output: (a) one or more entities of the plurality of entities and (b) one or more tags associated with the one or more entities of the plurality of entities.

A19. The system of any of A1-A18, wherein the system further comprises a model based systems engineering service (MBSE service), wherein the MBSE service is configured to graphically represent at least a subset of the plurality of entities for a project object.

A20. A computer-implemented method for systems engineering using an ontological framework, the computer-implemented method comprising:
receiving, via an input graphical user interface or one or more data connectors, engineering information, wherein the engineering information includes data for a plurality of entities stored on a datastore;
processing, using a language model, the engineering information to output entity information, wherein the entity information includes one or more data attributes of a first entity of the plurality of entities;
querying an ontological framework using the entity information, wherein querying the ontological framework determines a relationship between the first entity and a second entity of the plurality of entities; and
generating an output based, at least in part, on the relationship between the first entity and the second entity.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for systems engineering using an ontological framework, the system comprising:
at least one memory configured to store computer-readable instructions; and
at least one processor configured to execute the computer-readable instructions to perform operations, wherein the operations include:
receive, via a data connector to an engineering software, engineering information relating to at least a first system model entity, wherein:
the first system model entity is a part of a graphically displayed multiple-entity system model of a hardware system, the graphically displayed multiple-entity system model comprising at least the first system model entity and a second system model entity, the first system model entity comprising information relating to engineering requirements of a first subsystem of the hardware system, and the second system model entity comprising information relating to engineering requirements of a second subsystem of the hardware system, a first one of the first subsystem and the second subsystem is a subsystem of a second one of the first subsystem and the second subsystem;
the engineering software is configured to enable a user to input, modify, validate, test, or document the engineering information to thereby develop and store data related to at least the first subsystem of the hardware system;
process, using a language model, the engineering information to output entity information, wherein the entity information includes one or more data attributes related to the first system model entity;
query an ontological framework using the entity information, wherein querying the ontological framework determines relationship information related to a relationship between the first subsystem of the hardware system represented by the first system model entity and the second subsystem of the hardware system represented by the second system model entity;
based on the relationship information determined using the ontological framework, detect a conflict in the graphically displayed multiple-entity system model between two or more: (i) system requirements; (ii) system model entities; and/or (iii) combinations of (i) and (ii), including the first system model entity for the first subsystem and the second system model entity for the second subsystem.

2. The system of claim 1, wherein the relationship information is (a) automatically joined to a project object associated with the graphically displayed multiple-entity system model, (b) recommended to a user for confirmation to join the project object, or (c) presented to a user for additional data or data connectors.

3. The system of claim 1, wherein, to query the ontological framework using the entity information, the operations further include: searching the ontological framework for a matching entry of the ontological framework to the first system model entity; in response to determining a matching entry, determining at least one related entry in the ontological framework; and determining a first one of the at least one related entry as the second system model entity.

4. The system of claim 3, wherein the ontological framework is a graph of nodes and edges.

5. The system of claim 4, wherein the nodes correspond to potential system model entities.

6. The system of claim 4, wherein the edges correspond to spatial, temporal, and/or logical relationships between potential system model entities.

7. The system of claim 4, wherein searching the ontological framework for the matching entry of the ontological framework to the first system model entity includes: recursively traverse branches of the nodes and the edges; retrieving an entry at each node; determining the entry satisfies match condition for the first system model entity; and returning the entry as the matching entry.

8. The system of claim 1, wherein the operations further include: generate a digital twin that represents the graphically displayed multiple-entity system model.

9. The system of claim 8, wherein, to generate the digital twin, the operations further include: apply transformations to data of a project object associated with the graphically displayed multiple-entity system model to generate a populated digital twin data structure in a markup language.

10. The system of claim 9, wherein the transformations are generated based on, at least in part: (a) historical user interactions and/or event monitoring; and (b) a NLP model associating different system model entities, based on shared features, that were not labeled as related.

11. The system of claim 1, wherein the engineering information is unstructured information, and the entity information is structured information.

12. The system of claim 1, wherein the engineering software is a native environment to develop and store data for at least one component of the graphically displayed multiple-entity system model, the engineering software is locally hosted on a user device or a service remote from the user device, and the user device provides an interface for the user to perform interactions to input, modify, validate, test, or document the engineering information.

13. The system of claim 1, wherein the language model comprises a natural language processing model (NLP model), and the entity information further includes a tag including information indicative of (i) a name of the first system model entity; and/or (ii) respective data values corresponding to each of the one or more data attributes.

14. The system of claim 13, wherein the engineering information includes a set of machine-readable text.

15. The system of claim 13, wherein the engineering information includes engineering specifications.

16. The system of claim 13, wherein the engineering information is obtained, at least in part, by monitoring actions of one or more users of the system.

17. The system of claim 13, wherein the NLP model comprises a transformer-based deep neural network model.

18. The system of claim 13, wherein the NLP model is configured to output: (a) one or more system model entities of a plurality of system model entities and (b) one or more tags associated with the one or more system model entities of the plurality of system model entities.

19. The system of claim 1, wherein the system further comprises a model based systems engineering service (MBSE service), the MBSE service is configured to graphically represent at least a subset of a plurality of system model entities for a project object associated with the graphically displayed multiple-entity system model.

20. A computer-implemented method for systems engineering using an ontological framework, the computer-implemented method comprising:
receiving, via a data connector to a engineering software, engineering information relating to at least a first system model entity, wherein:
the first system model entity is a part of a graphically displayed multiple-entity system model of a hardware system, the graphically displayed multiple-entity system model comprising at least the first system model entity and a second system model entity, the first system model entity comprising information relating to engineering requirements of a first subsystem of the hardware system, and the second system model entity comprising information relating to engineering requirements of a second subsystem of the hardware system,
a first one of the first subsystem and the second subsystem is a subsystem of a second one of the first subsystem and the second subsystem,
the engineering software is configured to enable a user to input, modify, validate, test, or document the engineering information to thereby develop and store data related to at least the first subsystem of the hardware system,
processing, using a language model, the engineering information to output entity information, wherein the entity information includes one or more data attributes related to the first system model entity;
querying an ontological framework using the entity information, wherein querying the ontological framework determines relationship information related to a relationship between the first subsystem of the hardware system represented by the first system model entity and the second subsystem of the hardware system represented by the second system model entity; and
based on the relationship information determined using the ontological framework, detecting a conflict in the graphically displayed multiple-entity system model between two or more: (i) system requirements; (ii) system model entities; and/or (iii) combinations of (i) and (ii), including the first system model entity for the first subsystem and the second system model entity for the second subsystem.

* * * * *